US012716042B2

(12) United States Patent
Pedersen et al.

(10) Patent No.: US 12,716,042 B2
(45) Date of Patent: Aug. 25, 2026

(54) LIQUID ENZYME COMPOSITION WITH SULFITE SCAVENGER

(71) Applicant: Novozymes A/S, Bagsvaerd (DK)

(72) Inventors: Asbjoern Toftgaard Pedersen, Copenhagen (DK); Erik Hellstrand, Lund (SE)

(73) Assignee: Novozymes A/S, Bagsvaerd (DK)

( * ) Notice: Subject to any disclaimer, the term of this patent is extended or adjusted under 35 U.S.C. 154(b) by 245 days.

(21) Appl. No.: 18/262,291

(22) PCT Filed: Jan. 21, 2022

(86) PCT No.: PCT/EP2022/051348
§ 371 (c)(1),
(2) Date: Jul. 20, 2023

(87) PCT Pub. No.: WO2022/157311
PCT Pub. Date: Jul. 28, 2022

(65) Prior Publication Data

US 2024/0084226 A1 Mar. 14, 2024

(30) Foreign Application Priority Data

Jan. 22, 2021 (EP) .................................... 21153028

(51) Int. Cl.

| | |
|---|---|
| ***C11D 3/00*** | (2006.01) |
| ***C11D 3/34*** | (2006.01) |
| ***C11D 3/386*** | (2006.01) |
| ***C11D 17/04*** | (2006.01) |

(52) U.S. Cl.
CPC ........ *C11D 3/38609* (2013.01); *C11D 3/0084* (2013.01); *C11D 3/3472* (2013.01); *C11D 3/349* (2013.01); *C11D 3/38636* (2013.01); *C11D 17/045* (2013.01)

(58) Field of Classification Search
None
See application file for complete search history.

(56) References Cited

U.S. PATENT DOCUMENTS

| | | | |
|---|---|---|---|
| 4,243,543 | A | 1/1981 | Guilbert et al. |
| 2019/0002172 | A1 | 1/2019 | Hodgdon et al. |

FOREIGN PATENT DOCUMENTS

| | | | | |
|---|---|---|---|---|
| EP | 0533239 | A2 | 3/1993 | |
| EP | 1036840 | A2 | 9/2000 | |
| EP | 1700904 | A1 | 9/2006 | |
| EP | 3257931 | A1 * | 12/2017 | ......... C11D 3/38609 |
| WO | 1995029980 | A1 | 11/1995 | |
| WO | 1997028242 | A1 | 8/1997 | |
| WO | 0100765 | A1 | 1/2001 | |
| WO | 2005054420 | A1 | 6/2005 | |
| WO | 2005059077 | A1 | 6/2005 | |
| WO | 2005080540 | A1 | 9/2005 | |
| WO | 2016134088 | A1 | 8/2016 | |
| WO | 2018108382 | A1 | 6/2018 | |
| WO | 2019124486 | A1 | 6/2019 | |

* cited by examiner

*Primary Examiner* — Necholus Ogden, Jr.
(74) *Attorney, Agent, or Firm* — Eric J. Fechter

(57) ABSTRACT

The invention provides liquid enzyme compositions comprising a sulfite scavenger or a sulfite radical scavenger, useful in multi-compartment unit dose detergent products.

21 Claims, No Drawings

LIQUID ENZYME COMPOSITION WITH SULFITE SCAVENGER

CROSS-REFERENCE TO RELATED APPLICATIONS

This application is a 35 U.S.C. 371 national application of PCT/EP2022/051348, filed Jan. 21, 2022, which claims priority or the benefit from European Patent Application No. 21153028.2, filed Jan. 22, 2021. The contents of these applications are fully incorporated herein by reference.

FIELD OF THE INVENTION

The present invention relates to liquid enzyme compositions, useful in multi-compartment unit dose detergent products, comprising a sulfite scavenger or a sulfite radical scavenger.

BACKGROUND

Enzymes are widely used as active ingredients in consumer detergents and are effective for general cleaning, stain removal, color care, etc. Enzymes is one of many different ingredients in detergents, and compared to most other ingredients, they are a sensitive group of ingredients. Enzymes are proteins with complex structures and the interaction with, for example, surfactants, chelators, and bleaching agents, may modify the molecular structure and consequently reduce the storage stability.

It is well-known that oxidation provided by bleaching agents can be detrimental to enzyme activity, because oxidation of certain amino acids can inactivate the enzyme. However, it is not as widely recognized that reducing agents in detergents, like sulfites, can also significantly reduce the enzymatic stability. Sulfite may be added to liquid detergents to protect selected sensitive ingredients, like color and perfume, from oxidation. However, if enzymes are contacted with a surplus of unreacted sulfite, this may unintentionally also compromise the enzyme stability.

SUMMARY OF THE INVENTION

The present invention provides, in a first aspect, a liquid enzyme composition comprising 0.01-25% w/w of active enzyme protein, and 0.05-30% w/w of a sulfite scavenger or a sulfite radical scavenger.

In a second aspect is provided a multi-compartment water-soluble unit dose detergent article, comprising (a) a first compartment consisting of the liquid enzyme composition of the invention, and (b) a second compartment comprising a salt of sulfite, bisulfite or metabisulfite, and one or more detergent ingredients selected from surfactants, builders, dye transfer inhibiting agents, dispersants, anti-redeposition agents, suds suppressors, hueing dyes, aesthetic dyes, opacifiers, perfumes, structurants, hydrotropes, pigments and mixtures thereof; wherein the first and second compartments are adjacent, and each is surrounded by water-soluble film.

Other aspects and embodiments of the invention are apparent from the description and examples.

Unless otherwise indicated, or if it is apparent from the context that something else is meant, all percentages are percentage by weight (% w/w).

DETAILED DESCRIPTION

We have found that it is possible to design a unit dose multi-compartment detergent article, such that a first compartment contains enzyme and optionally other detergent components that do not require the presence of sulfite, while other compartment(s) can be freely designed with sulfite and components requiring the presence of sulfite. The enzyme(s) in the first compartment will be protected from sulfite diffusing through the water-soluble film (typically PVA) separating the two compartments, by addition of a sulfite scavenger or a sulfite radical scavenger.

We have found that sulfites readily migrate through water-soluble films. Thus, solving the problem of sulfite-inactivation of enzymes requires not only separating the enzyme from the sulfite in two individual compartments, but also that the enzyme compartment contains a sulfite scavenger to remove any sulfite migrating through the film that separates the two compartments.

In the context of the present invention, the term "sulfite scavenger" means a compound capable of removing sulfite, bisulfite or metabisulfite ions from a solution by covalent modification or by oxidation. The sulfite, bisulfite or metabisulfite ions are converted by the sulfite scavenger to other compounds that do not reduce enzyme activity when stored together with a (detergent) enzyme as described below. Below, the term "sulfite" is intended to mean sulfite, bisulfite or metabisulfite ions.

Advantageously, the enzyme in the enzyme compartment is delivered from the enzyme producer as a liquid co-formulation of the enzyme, and the sulfite scavenger or sulfite radical scavenger. Such liquid enzyme composition (co-formulation) may be a concentrated enzyme product having a high concentration of active enzyme protein, which is subsequently diluted with other detergent ingredients before being encapsulated in the first compartment.

Accordingly, the invention provides a liquid enzyme composition comprising 0.01-25% w/w of active enzyme protein, and 0.05-30% w/w of a sulfite scavenger or a sulfite radical scavenger.

The liquid enzyme composition may also comprise a polyhydric alcohol and/or water as a delivery vehicle for the enzyme and the sulfite scavenger or sulfite radical scavenger. The liquid enzyme composition may include the polyhydric alcohol in an amount of 1-80% w/w, and/or water in an amount of 10-98% w/w.

Further, the invention provides a multi-compartment water-soluble unit dose detergent article, comprising (a) a first compartment consisting of a liquid enzyme composition comprising 0.01-25% w/w of active enzyme protein, and 0.05-30% w/w of a sulfite scavenger or sulfite radical scavenger, and (b) a second compartment comprising a salt of sulfite, bisulfite or metabisulfite, and one or more detergent ingredients selected from surfactants, builders, dye transfer inhibiting agents, dispersants, anti-redeposition agents, suds suppressors, hueing dyes, aesthetic dyes, opacifiers, perfumes, structurants, hydrotropes, pigments and mixtures thereof;

wherein the first and second compartments are adjacent, and each is surrounded by water-soluble film.

The detergent composition comprised in the multi-compartment water-soluble unit dose article is made up of the ingredients comprised in the first and second compartments, and optionally also in any further compartments of the unit dose detergent article. The ingredients of the detergent composition are described in more detail below in the paragraph "Detergent Composition".

Preferably, the detergent ingredients in the second compartment are selected from hueing dyes, aesthetic dyes, opacifiers, perfumes, pigments and mixtures thereof.

The invention also provides a method of making the multi-compartment water-soluble unit dose detergent article of the invention, comprising (a) encapsulating a liquid enzyme composition comprising 0.01-25% w/w of active enzyme protein, and 0.05-30% w/w of a sulfite scavenger or sulfite radical scavenger, in a first compartment, and (b) encapsulating a second composition comprising a salt of sulfite, bisulfite or metabisulfite, and one or more detergent ingredients selected from surfactants, builders, dye transfer inhibiting agents, dispersants, anti-redeposition agents, suds suppressors, hueing dyes, aesthetic dyes, opacifiers, perfumes, structurants, hydrotropes, pigments and mixtures thereof, in a second compartment;

wherein the first and second compartments are adjacent, and each is surrounded by water-soluble film.

Sulfite is an antioxidant (reducing agent) that may be added to detergents to protect, for example, the color and/or the perfume from oxidation.

Sulfite may react with enzymes through at least two distinct reaction mechanisms:

1) direct reduction of labile functional groups by sulfite, and
2) oxidation of labile functional groups by sulfite radicals and/or radicals generated via reactions initiated by or including sulfite. Additionally, sulfite is known to undergo addition (sulphonation) with unsaturated bonds (e.g. C═C, C═N, and C≡C) which may also be relevant for its interaction with enzymes.

Reduction labile functional groups are mainly disulfide-bridges (Cys-Cys) in the molecule, where the reducing agent reduce the disulfide bridge (R—S—S—R) to free thiols (R—SH). However, it could also be salt-bridges (between the anionic carboxylate of aspartic acid, or glutamic acid and the cationic ammonium of lysine, or the cationic guanidium of arginine) where the reducing agent reduce the carboxylate, thus breaking the salt-bridge.

Even when an enzyme does not have reduction labile functional groups, it may still be prone to oxidation by sulfite radicals and/or radicals generated via reactions initiated by or including sulfite. This can be prevented by including a sulfite radical scavenger. In this situation, the enzyme can co-exist with sulfite if a sulfite radical scavenger is present. Generation of radicals is a relatively slow process, and the radical scavenger will protect the enzyme by extinguishing the radicals, as they are formed.

Oxidation labile functional groups are mainly solvent exposed amino acids side-chains susceptible to oxidation. Such amino acids include, but are not limited to; methionine, cysteine, tryptophan, histidine, tyrosine, phenylalanine. Oxidation of amino acid residues in enzymes may lead to loss of enzyme activity, alteration of enzyme specificity and/or reduction of enzyme stability.

Sulfite radicals (or bisulfite or metabisulfite radicals) can be formed through at least two pathways:

1) through one electron oxidations of sulfite (or bisulfite or metabisulfite) by metal ions (e.g. $Ce^{4+}$), other radicals (formed e.g. through radiolysis or Fenton-type reactions), among others; and
2) through photoionization (direct or via photosensitizers) of sulfite (or bisulfite or metabisulfite).

Additionally, in subsequent chain reactions, other radicals, such as hydroxyl radicals and sulfate anion radicals, may be formed.

Sulfite, and sulfite derived radicals, are in general strong oxidants with standard reduction potentials (SRP)>0.7 V vs Standard Hydrogen Electrode (SHE). SRP of Sulfur trioxide radical anion is 0.73 V vs SHE, SRP of sulfate anion radical is 2.4V vs SHE, SRP of hydroxyl radical is 2.7V vs. SHE. (Armstrong et al. 2013, https://core.ac.uk/download/pdf/85215016.pdf)

Sulfite Scavengers

Since sulfite, bisulfite and metabisulfite are reducing agents (antioxidants), they may be removed (scavenged) by oxidation.

Strong oxidants may, as explained above, damage enzymes by oxidation of amino acid side chains. Strong oxidants with a reduction potential of >0.6V vs SHE are therefore not relevant for the present invention, such oxidants include hydrogen peroxide (and other peroxides), chlorine oxyanions, permanganate and chromate. On the other hand, the oxidizing agent must be sufficiently strong to readily react with sulfite. In the present invention such oxidants have a reduction potential >0.1V vs SHE.

Examples of sulfite scavengers acting by oxidation include, but are not limited to, amine N-oxides like N-methylmorpholine N-oxide and derivatives, pyridine N-oxide and derivates (see U.S. Pat. No. 3,467,659A), and trimethyl N-oxide; and potassium ferricyanide and other complexed metal ions; and oxidized glutathione and other disulfide containing compounds like cystine and lipoic acid.

Thus, in a preferred embodiment, the sulfite scavenger is selected from the group consisting of N-methylmorpholine N-oxide, pyridine N-oxide (and derivatives), potassium ferricyanide and other salts of ferricyanide, and oxidized glutathione.

Another group of sulfite, bisulfite and metabisulfite scavengers are aldehydes, which generally reacts covalently with sulfite to form aldehyde-sulfite adduct (sulfonate). Sulfite may also react with sterically unhindered cyclic and methyl ketones in a similar fashion. Furigay 2018 gives examples of aldehydes and reactive and unreactive ketones.

Examples of aldehydes that react with sulfite include, but are not limited to, glyoxylic acid/glyoxalate, acetaldehyde, glyceraldehyde, citral, benzaldehyde, formaldehyde, acrolein, senecioaldehyde, furfural, butyraldehyde, cinnamaldehyde, and betaine aldehyde.

Examples of ketones that react with sulfite include, but are not limited to, pyruvic acid, oxaloacetate, 2-pentanone, butanone, cyclohexanone, diethyl 2-methyl-3-oxosuccinate, acetoacidic acid, ethyl acetoacetate, and methyl acetoacetate.

In a particularly preferred embodiment, the sulfite scavenger is selected from the group consisting of glyoxylic acid/glyoxalate, betaine aldehyde, glyceraldehyde, pyruvic acid, oxaloacetate, ethyl acetoacetate, and methyl acetoacetate.

Sulfite Radical Scavengers

Sulfite radical scavengers are compounds that can undergo one electron reduction thereby terminating radical chain reactions. Specifically, radical scavengers that can react with sulfite derived radicals such as the sulfur trioxide radical anion.

Examples of radical scavengers that react with sulfite radicals include, but are not limited to, ascorbic acid/ascorbate, erythorbic acid/erythrobate, hydroquinone, tryptophan and its metabolites, cysteine, metal salts (e.g. $FeSO_4$, $FeCl_2$, $CoCl_2$, $Zn(CH_3COO)_2$), halide salts (e.g. KI, KBr), mannitol (and other sugar alcohols), flavonoids (Cathecin, Chrysin, Genistein, etc.), phenolic acids (Gallic acid, Ellagic acid, p-coumarin, ferulic acid), indoles, alyl sulfide, vitamin A (Retinol), tocopherols (α, β, λ and δ tocopherol), tocotrienols, beta-carotene, vitamin K, butylated hydroxyanisole (BHA), butylated hydroxytoluene (BHT), tert-butylhydroquinone (TBHQ), trimethoxy benzoic acid (TMBA), 2,4,5-trihydroxy butyrophenone, nordihydroguaiaretic acid (NGDA), 4-hexylresorcinol, 5ereph (6-hydroxy-2,5,7,8-tetramethylchroman-2-carboxylic acid), tannic acid, gallic acid and its alkyl ester (e.g. propyl gallate), ethoxyquin, 2,2,4-trimethyl-1,2-dihydroquinoline and polymers thereof, Tinogard TT, Tinogard AO-6, Tinogard TS, uric acid, dihydroxy fumaric acid and salts thereof, 4-hydroxybenzoic acid, and hydroxycinnamic acid.

In a particularly preferred embodiment, the sulfite radical scavenger is selected from the group consisting of ascorbic acid/ascorbate, erythorbic acid/erythrobate, hydroquinone and derivatives, gallic acid and its alkyl esters, Trolox (6-hydroxy-2,5,7,8-tetramethylchroman-2-carboxylic acid), cysteine, halide salts (potassium iodine and potassium bromine), and trimethoxy benzoic acid (TMBA).

Enzymes

The enzymes used in the liquid enzyme composition of the invention are catalytic proteins, and the term "active enzyme protein" is defined herein as the amount of catalytic protein(s), which exhibits enzymatic activity. This can be determined using an activity based analytical enzyme assay. In such assays, the enzyme typically catalyzes a reaction generating a colored compound. The amount of the colored compound can be measured and correlated to the concentration of the active enzyme protein. This technique is well-known in the art.

The enzyme(s) may be one or more (detergent) enzymes, such as selected from the group consisting of protease, lipase, cutinase, amylase, carbohydrase, cellulase, pectinase, mannanase, galactanase, xylanase, nuclease (DNase, RNase), dispersin, catalase, perhydrolase, and oxidase (such as laccase and/or peroxidase). More preferred detergent enzymes are selected from the group consisting of protease, lipase, amylase, cellulase, pectinase, mannanase, xylanase, nuclease (Dnase, Rnase), dispersin, catalase, and perhydrolase.

The enzyme may be a naturally occurring enzyme of bacterial or fungal origin, or it may be a variant derived from one or more naturally occurring enzymes by gene shuffling and/or by substituting, deleting or inserting one or more amino acids. Chemically modified or protein engineered mutants are included.

The liquid enzyme composition contains at least one enzyme in an amount of 0.1-25% w/w active enzyme protein; preferably in an amount of 0.1-20% w/w active enzyme protein.

Proteases

Suitable proteases may be of any origin, but are preferably of bacterial or fungal origin, optionally in the form of protein engineered or chemically modified mutants. The protease may be an alkaline protease, such as a serine protease or a metalloprotease. A serine protease may for example be of the S1 family, such as trypsin, or the S8 family such as a subtilisin. A metalloprotease may for example be a thermolysin, e.g. from the M4 family, or another metalloprotease such as those from the M5, M7 or M8 families.

The term "subtilases" refers to a sub-group of serine proteases according to Siezen et al., *Protein Eng.* 4 (1991) 719-737 and Siezen et al., *Protein Sci.* 6 (1997) 501-523. Serine proteases are a subgroup of proteases characterized by having a serine in the active site, which forms a covalent adduct with the substrate. The subtilases may be divided into six subdivisions, the Subtilisin family, the Thermitase family, the Proteinase K family, the Lantibiotic peptidase family, the Kexin family and the Pyrolysin family.

Although proteases suitable for detergent use may be obtained from a variety of organisms, including fungi such as *Aspergillus*, detergent proteases have generally been obtained from bacteria and in particular from *Bacillus*. Examples of *Bacillus* species from which subtilases have been derived include *Bacillus lentus, Bacillus alkalophilus, Bacillus subtilis, Bacillus amyloliquefaciens, Bacillus licheniformis, Bacillus pumilus* and *Bacillus gibsonii*. Particular subtilisins include subtilisin *lentus*, subtilisin Novo, subtilisin Carlsberg, subtilisin BPN', subtilisin 309, subtilisin 147 and subtilisin 168 and e.g. protease PD138 (described in WO 93/18140). Other useful proteases are e.g. those described in WO 01/16285 and WO 02/16547.

Examples of trypsin-like proteases include the *Fusarium* protease described in WO 94/25583 and WO 2005/040372, and the chymotrypsin proteases derived from Cellumonas described in WO 2005/052161 and WO 2005/052146.

Examples of metalloproteases include the neutral metalloproteases described in WO 2007/044993 such as those derived from *Bacillus amyloliquefaciens*, as well as e.g. the metalloproteases described in WO 2015/158723 and WO 2016/075078.

Examples of useful proteases are the protease variants described in WO 89/06279 WO 92/19729, WO 96/34946, WO 98/20115, WO 98/20116, WO 99/11768, WO 01/44452, WO 03/006602, WO 2004/003186, WO 2004/041979, WO 2007/006305, WO 2011/036263, WO 2014/207227, WO 2016/087617 and WO 2016/174234. Preferred protease variants may, for example, comprise one or more of the mutations selected from the group consisting of: S3T, V4I, S9R, S9E, A15T, S24G, S24R, K27R, N42R, S55P, G59E, G59D, N60D, N60E, V66A, N74D, S85R, A96S, S97G, S97D, S97A, S97SD, S99E, S99D, S99G, S99M, S99N, S99R, S99H, S101A, V1021, V102Y, V102N, S104A, G116V, G116R, H118D, H118N, A120S, S126L, P127Q, S128A, S154D, A156E, G157D, G157P, S158E, Y161A, R164S, Q176E, N179E, S182E, Q185N, A188P, G189E, V193M, N198D, V1991, Q200L, Y203W, S206G, L211Q, L211D, N212D, N212S, M216S, A226V, K229L, Q230H, Q239R, N246K, S253D, N255W, N255D, N255E, L256E, L256D T268A and R269H, wherein position numbers correspond to positions of the *Bacillus lentus* protease shown in SEQ ID NO: 1 of WO 2016/001449. Protease variants having one or more of these mutations are preferably variants of the *Bacillus lentus* protease (Savinase®, also known as subtilisin 309) shown in SEQ ID NO: 1 of WO 2016/001449 or of the *Bacillus amyloliquefaciens* protease (BPN') shown in SEQ ID NO: 2 of WO 2016/001449. Such protease variants preferably have at least 80% sequence identity to SEQ ID NO: 1 or to SEQ ID NO: 2 of WO 2016/001449.

Another protease of interest is the alkaline protease from *Bacillus lentus* DSM 5483, as described for example in WO 91/02792, and variants thereof which are described for example in WO 92/21760, WO 95/23221, EP 1921147, EP 1921148 and WO 2016/096711.

The protease may alternatively be a variant of the TY145 protease having SEQ ID NO: 1 of WO 2004/067737, for example a variant comprising a substitution at one or more positions corresponding to positions 27, 109, 111, 171, 173, 174, 175, 180, 182, 184, 198, 199 and 297 of SEQ ID NO: 1 of WO 2004/067737, wherein said protease variant has a sequence identity of at least 75% but less than 100% to SEQ ID NO: 1 of WO 2004/067737. TY145 variants of interest are described in e.g. WO 2015/014790, WO 2015/014803, WO 2015/014804, WO 2016/097350, WO 2016/097352, WO 2016/097357 and WO 2016/097354.

Examples of preferred proteases include:

(a) variants of SEQ ID NO: 1 of WO 2016/001449 comprising two or more substitutions selected from the group consisting of S9E, N43R, N76D, Q206L, Y209W, S259D and L262E, for example a variant with the substitutions S9E, N43R, N76D, V205I, Q206L, Y209W, S259D, N261W and L262E, or with the substitutions S9E, N43R, N76D, N185E, S188E, Q191N, A194P, Q206L, Y209W, S259D and L262E, wherein position numbers are based on the numbering of SEQ ID NO: 2 of WO 2016/001449;

(b) a variant of the polypeptide of SEQ ID NO: 1 of WO 2016/001449 with the mutation S99SE, wherein position numbers are based on the numbering of SEQ ID NO: 2 of WO 2016/001449;

(c) a variant of the polypeptide of SEQ ID NO: 1 of WO 2016/001449 with the mutation S99AD, wherein position numbers are based on the numbering of SEQ ID NO: 2 of WO 2016/001449;

(d) a variant of the polypeptide of SEQ ID NO: 1 of WO 2016/001449 with the substitutions Y167A+R170S+A194P, wherein position numbers are based on the numbering of SEQ ID NO: 2 of WO 2016/001449;

(e) a variant of the polypeptide of SEQ ID NO: 1 of WO 2016/001449 with the substitutions S9R+A15T+V68A+N218D+Q245R, wherein position numbers are based on the numbering of SEQ ID NO: 2 of WO 2016/001449;

(f) a variant of the polypeptide of SEQ ID NO: 1 of WO 2016/001449 with the substitutions S9R+A15T+G61E+V68A+A194P+V205I+Q245R+N261D, wherein position numbers are based on the numbering of SEQ ID NO: 2 of WO 2016/001449;

(g) a variant of the polypeptide of SEQ ID NO: 1 of WO 2016/001449 with the substitutions S99D+S101R/E+S103A+V104I+G160S; for example a variant of SEQ ID NO: 1 of WO 2016/001449 with the substitutions S3T+V4I+S99D+S101E+S103A+V104I+G160S+V205I, wherein position numbers are based on the numbering of SEQ ID NO: 2 of WO 2016/001449;

(h) a variant of the polypeptide of SEQ ID NO: 2 of WO 2016/001449 with the substitutions S24G+S53G+S78N+S101N+G128A/S+Y217Q, wherein position numbers are based on the numbering of SEQ ID NO: 2 of WO 2016/001449;

(i) the polypeptide disclosed in GENESEQP under accession number BER84782, corresponding to SEQ ID NO: 302 in WO 2017/210295;

(j) a variant of the polypeptide of SEQ ID NO: 1 of WO 2016/001449 with the substitutions S99D+S101E+S103A+V104I+S156D+G160S+L262E, wherein position numbers are based on the numbering of SEQ ID NO: 2 of WO 2016/001449;

(k) a variant of the polypeptide of SEQ ID NO: 1 of WO 2016/001449 with the substitutions S9R+A15T+G61E+V68A+N76D+S99G+N218D+Q245R, wherein position numbers are based on the numbering of SEQ ID NO: 2 of WO 2016/001449;

(l) a variant of the polypeptide of SEQ ID NO: 1 of WO 2016/001449 with the substitutions V68A+S106A, wherein position numbers are based on the numbering of SEQ ID NO: 2 of WO 2016/001449; and (m) a variant of the polypeptide of SEQ ID NO: 1 of WO 2004/067737 with the substitutions S27K+N109K+S111E+S171E+S173P+G174K+S175P+F180Y+G182A+L184F+Q198E+N199+T297P, wherein position numbers are based on the numbering of SEQ ID NO: 1 of WO 2004/067737.

Suitable commercially available protease enzymes include those sold under the trade names Alcalase®, Duralase™, Durazym™, Relase®, Relase® Ultra, Savinase®, Savinase® Ultra, Primase™, Polarzyme®, Kannase®, Liquanase®, Liquanase® Ultra, Ovozyme®, Coronase®, Coronase® Ultra, Blaze®, Blaze Evity® 100T, Blaze Evity® 125T, Blaze Evity® 150T, Blaze Evity® 200T, Neutrase®, Everlase®, Esperase®, Progress® Uno, Progress® In and Progress® Excel (Novozymes A/S), those sold under the tradename Maxatase™ Maxacal™, Maxapem®, Purafect® Ox, Purafect® OxP, Puramax®, FN2 ™, FN3 ™, FN4$^{ex}$™, Excellase®, Excellenz™ P1000, Excellenz™ P1250, Eraser™, Preferenz® P100, Purafect Prime, Preferenz P110 ™, Effectenz P1000 ™, Purafect®, Effectenz P1050 ™, Purafect® Ox, Effectenz™ P2000, Purafast™, Properase®, Opticlean™ and Optimase® (Danisco/DuPont), BLAP (sequence shown in FIG. 29 of U.S. Pat. No. 5,352,604) and variants hereof (Henkel AG), and KAP (*Bacillus alkalophilus* subtilisin) from Kao.

Lipases and Cutinases

Suitable lipases and cutinases include those of bacterial or fungal origin. Chemically modified or protein engineered mutant enzymes are included. Examples include lipase from *Thermomyces*, e.g. from *T. lanuginosus* (previously named *Humicola lanuginosa*) as described in EP258068 and EP305216, cutinase from *Humicola*, e.g. *H. insolens* (WO96/13580), lipase from strains of *Pseudomonas* (some of these now renamed to *Burkholderia*), e.g. *P. alcaligenes* or *P. pseudoalcaligenes* (EP218272), *P. cepacia* (EP331376), P. sp. Strain SD705 (WO95/06720 & WO96/27002), *P. wisconsinensis* (WO96/12012), GDSL-type *Streptomyces* lipases (WO10/065455), cutinase from *Magnaporthe grisea* (WO10/107560), cutinase from *Pseudomonas mendocina* (U.S. Pat. No. 5,389,536), lipase from *Thermobifida fusca* (WO11/084412), *Geobacillus stearothermophilus* lipase (WO11/084417), lipase from *Bacillus subtilis* (WO11/084599), and lipase from *Streptomyces griseus* (WO11/150157) and *S. pristinaespiralis* (WO12/137147).

Other examples are lipase variants such as those described in EP407225, WO92/05249, WO94/01541, WO94/25578, WO95/14783, WO95/30744, WO95/35381, WO95/22615, WO96/00292, WO97/04079, WO97/07202, WO00/34450, WO00/60063, WO01/92502, WO07/87508 and WO09/109500.

Preferred commercial lipase products include Lipolase™, Lipex™, Lipolex™ and Lipoclean™ (Novozymes A/S), Lumafast (originally from Genencor) and Lipomax (originally from Gist-Brocades).

Still other examples are lipases sometimes referred to as acyltransferases or perhydrolases, e.g. acyltransferases with homology to *Candida antarctica* lipase A (WO10/111143), acyltransferase from *Mycobacterium smegmatis* (WO05/56782), perhydrolases from the CE 7 family (WO09/67279), and variants of the *M. smegmatis* perhydrolase in particular the S54V variant used in the commercial product Gentle Power Bleach from Huntsman Textile Effects Pte Ltd (WO10/100028).

Amylases

Suitable amylases may be an alpha-amylase or a glucoamylase and may be of bacterial or fungal origin. Chemically modified or protein engineered mutants are included. Amylases include, for example, alpha-amylases obtained from *Bacillus*, e.g., a special strain of *Bacillus licheniformis*, described in more detail in GB 1,296,839.

Suitable amylases include amylases having SEQ ID NO: 2 in WO 95/10603 or variants having 90% sequence identity to SEQ ID NO: 3 thereof. Preferred variants are described in WO 94/02597, WO 94/18314, WO 97/43424 and SEQ ID NO: 4 of WO 99/019467, such as variants with substitutions in one or more of the following positions: 15, 23, 105, 106, 124, 128, 133, 154, 156, 178, 179, 181, 188, 190, 197, 201, 202, 207, 208, 209, 211, 243, 264, 304, 305, 391, 408, and 444.

Different suitable amylases include amylases having SEQ ID NO: 6 in WO 02/010355 or variants thereof having 90% sequence identity to SEQ ID NO: 6. Preferred variants of SEQ ID NO: 6 are those having a deletion in positions 181 and 182 and a substitution in position 193.

Other amylases which are suitable are hybrid alpha-amylase comprising residues 1-33 of the alpha-amylase derived from *B. amyloliquefaciens* shown in SEQ ID NO: 6 of WO 2006/066594 and residues 36-483 of the *B. licheniformis* alpha-amylase shown in SEQ ID NO: 4 of WO 2006/066594 or variants having 90% sequence identity thereof. Preferred variants of this hybrid alpha-amylase are those having a substitution, a deletion or an insertion in one of more of the following positions: G48, T49, G107, H156, A181, N190, M197, I201, A209 and Q264. Most preferred variants of the hybrid alpha-amylase comprising residues 1-33 of the alpha-amylase derived from *B. amyloliquefaciens* shown in SEQ ID NO: 6 of WO 2006/066594 and residues 36-483 of SEQ ID NO: 4 are those having the substitutions:

M197T;
H156Y+A181T+N190F+A209V+Q264S; or
G48A+T491+G107A+H156Y+A181T+N190F+I201F+A209V+Q264S.

Further amylases which are suitable are amylases having SEQ ID NO: 6 in WO 99/019467 or variants thereof having 90% sequence identity to SEQ ID NO: 6. Preferred variants of SEQ ID NO: 6 are those having a substitution, a deletion or an insertion in one or more of the following positions: R181, G182, H183, G184, N195, I206, E212, E216 and K269. Particularly preferred amylases are those having deletion in positions R181 and G182, or positions H183 and G184.

Additional amylases which can be used are those having SEQ ID NO: 1, SEQ ID NO: 3, SEQ ID NO: 2 or SEQ ID NO: 7 of WO 96/023873 or variants thereof having 90% sequence identity to SEQ ID NO: 1, SEQ ID NO: 2, SEQ ID NO: 3 or SEQ ID NO: 7. Preferred variants of SEQ ID NO: 1, SEQ ID NO: 2, SEQ ID NO: 3 or SEQ ID NO: 7 are those having a substitution, a deletion or an insertion in one or more of the following positions: 140, 181, 182, 183, 184, 195, 206, 212, 243, 260, 269, 304 and 476, using SEQ ID 2 of WO 96/023873 for numbering. More preferred variants are those having a deletion in two positions selected from 181, 182, 183 and 184, such as 181 and 182, 182 and 183, or positions 183 and 184. Most preferred amylase variants of SEQ ID NO: 1, SEQ ID NO: 2 or SEQ ID NO: 7 are those having a deletion in positions 183 and 184 and a substitution in one or more of positions 140, 195, 206, 243, 260, 304 and 476.

Other amylases which can be used are amylases having SEQ ID NO: 2 of WO 08/153815, SEQ ID NO: 10 in WO 01/66712 or variants thereof having 90% sequence identity to SEQ ID NO: 2 of WO 08/153815 or 90% sequence identity to SEQ ID NO: 10 in WO 01/66712. Preferred variants of SEQ ID NO: 10 in WO 01/66712 are those having a substitution, a deletion or an insertion in one of more of the following positions: 176, 177, 178, 179, 190, 201, 207, 211 and 264.

Further suitable amylases are amylases having SEQ ID NO: 2 of WO 09/061380 or variants having 90% sequence identity to SEQ ID NO: 2 thereof. Preferred variants of SEQ ID NO: 2 are those having a truncation of the C-terminus and/or a substitution, a deletion or an insertion in one of more of the following positions: Q87, Q98, S125, N128, T131, T165, K178, R180, S181, T182, G183, M201, F202, N225, S243, N272, N282, Y305, R309, D319, Q320, Q359, K444 and G475. More preferred variants of SEQ ID NO: 2 are those having the substitution in one of more of the following positions: Q87E,R, Q98R, S125A, N128C, T131I, T165I, K178L, T182G, M201L, F202Y, N225E,R, N272E, R, S243Q,A,E,D, Y305R, R309A, Q320R, Q359E, K444E and G475K and/or deletion in position R180 and/or S181 or of T182 and/or G183. Most preferred amylase variants of SEQ ID NO: 2 are those having the substitutions:

N128C+K178L+T182G+Y305R+G475K;
N128C+K178L+T182G+F202Y+Y305R+D319T+G475K;
S125A+N128C+K178L+T182G+Y305R+G475K; or
S125A+N128C+T131I+T165I+K178L+T182G+Y305R+G475K wherein the variants are C-terminally truncated and optionally further comprises a substitution at position 243 and/or a deletion at position 180 and/or position 181.

Further suitable amylases are amylases having SEQ ID NO: 1 of WO13184577 or variants having 90% sequence identity to SEQ ID NO: 1 thereof. Preferred variants of SEQ ID NO: 1 are those having a substitution, a deletion or an insertion in one of more of the following positions: K176, R178, G179, T180, G181, E187, N192, M199, 1203, S241, R458, T459, D460, G476 and G477. More preferred variants of SEQ ID NO: 1 are those having the substitution in one of more of the following positions: K176L, E187P, N192FYH, M199L, I203YF, S241QADN, R458N, T459S, D460T, G476K and G477K and/or deletion in position R178 and/or S179 or of T180 and/or G181. Most preferred amylase variants of SEQ ID NO: 1 are those having the substitutions:

E187P+I203Y+G476K
E187P+I203Y+R458N+T459S+D460T+G476K
wherein the variants optionally further comprises a substitution at position 241 and/or a deletion at position 178 and/or position 179.

Further suitable amylases are amylases having SEQ ID NO: 1 of WO10104675 or variants having 90% sequence identity to SEQ ID NO: 1 thereof. Preferred variants of SEQ ID NO: 1 are those having a substitution, a deletion or an insertion in one of more of the following positions: N21, D97, V128 K177, R179, S180, I181, G182, M200, L204, E242, G477 and G478. More preferred variants of SEQ ID NO: 1 are those having the substitution in one of more of the following positions: N21D, D97N, V128I K177L, M200L, L204YF, E242QA, G477K and G478K and/or deletion in position R179 and/or S180 or of I181 and/or G182. Most preferred amylase variants of SEQ ID NO: 1 are those having the substitutions:

N21D+D97N+V128I
wherein the variants optionally further comprise a substitution at position 200 and/or a deletion at position 180 and/or position 181.

Other suitable amylases are the alpha-amylase having SEQ ID NO: 12 in WO01/66712 or a variant having at least 90% sequence identity to SEQ ID NO: 12. Preferred amylase variants are those having a substitution, a deletion or an insertion in one of more of the following positions of SEQ ID NO: 12 in WO01/66712: R28, R118, N174; R181, G182, D183, G184, G186, W189, N195, M202, Y298, N299, K302, S303, N306, R310, N314; R320, H324, E345, Y396, R400, W439, R444, N445, K446, Q449, R458, N471, N484. Particular preferred amylases include variants having a deletion of D183 and G184 and having the substitutions R118K, N195F, R320K and R458K, and a variant additionally having substitutions in one or more position selected from the group: M9, G149, G182, G186, M202, T257, Y295, N299, M323, E345 and A339, most preferred a variant that additionally has substitutions in all these positions.

Other examples are amylase variants such as those described in WO2011/098531, WO2013/001078 and WO2013/001087.

Commercially available amylases are Duramyl™, Termamyl™, Fungamyl™, Stainzyme™, Stainzyme Plus™, Natalase™, Liquozyme X and BAN™ (from Novozymes A/S), and Rapidase™, Purastar™/Effectenz™, Powerase, Preferenz S1000, Preferenz S100 and Preferenz S110 (from Genencor International Inc./DuPont).

Cellulases

Suitable cellulases include mono-component and mixtures of enzymes of bacterial or fungal origin. Chemically modified or protein engineered mutants are also contemplated. The cellulase may for example be a mono-component or a mixture of mono-component endo-1,4-beta-glucanase also referred to as endoglucanase.

Suitable cellulases include those from the genera *Bacillus, Pseudomonas, Humicola, Myceliophthora, Fusarium, Thielavia, Trichoderma*, and *Acremonium*. Exemplary cellulases include a fungal cellulase from *Humicola insolens* (U.S. Pat. No. 4,435,307) or from *Trichoderma*, e.g. *T. reesei* or *T. viride*. Other suitable cellulases are from *Thielavia* e.g. *Thielavia terrestris* as described in WO 96/29397 or the fungal cellulases produced from *Myceliophthora thermophila* and *Fusarium oxysporum* disclosed in U.S. Pat. Nos. 5,648,263, 5,691,178, 5,776,757, WO 89/09259 and WO 91/17244. Also relevant are cellulases from *Bacillus* as described in WO 02/099091 and JP 2000210081. Suitable cellulases are alkaline or neutral cellulases having care benefits. Examples of cellulases are described in EP 0 495 257, EP 0 531 372, WO 96/11262, WO 96/29397, WO 98/08940. Other examples are cellulase variants such as those described in WO 94/07998, EP 0 531 315, U.S. Pat. Nos. 5,457,046, 5,686,593, 5,763,254, WO 95/24471, WO 98/12307.

Other cellulases are endo-beta-1,4-glucanase enzyme having a sequence of at least 97% identity to the amino acid sequence of position 1 to position 773 of SEQ ID NO:2 of WO 2002/099091 or a family 44 xyloglucanase, which a xyloglucanase enzyme having a sequence of at least 60% identity to positions 40-559 of SEQ ID NO: 2 of WO 2001/062903.

Commercially available cellulases include Carezyme®, Carezyme® Premium, Celluzyme®, Celluclean®, Celluclast®, Endolase®, Renozyme®; Whitezyme® Celluclean Classic, Cellusoft® (Novozymes A/S), Puradax®, Puradax HA, and Puradax EG (available from Genencor International Inc.) and KAC-500(B)™ (Kao Corporation).

Mannanases

Suitable mannanases include those of bacterial or fungal origin. Chemically or genetically modified mutants are included. The mannanase may be an alkaline mannanase of Family 5 or 26. It may be a wild-type from *Bacillus* or *Humicola*, particularly *B. agaradhaerens, B. licheniformis, B. halodurans, B. clausii*, or *H. insolens*. Suitable mannanases are described in WO 1999/064619. A commercially available mannanase is Mannaway (Novozymes A/S).

Nucleases

Suitable nucleases include deoxyribonucleases (Dnases) and ribonucleases (Rnases) which are any enzyme that catalyzes the hydrolytic cleavage of phosphodiester linkages in the DNA or RNA backbone respectively, thus degrading DNA and RNA. There are two primary classifications based on the locus of activity. Exonucleases digest nucleic acids from the ends. Endonucleases act on regions in the middle of target molecules. The nuclease is preferably a Dnase, which is preferable is obtainable from a microorganism, preferably a bacterium; in particular a Dnase which is obtainable from a species of *Bacillus* is preferred; in particular a Dnase which is obtainable from *Bacillus* cibi, *Bacillus subtilis* or *Bacillus licheniformis* is preferred. Examples of such Dnases are described in WO 2011/098579, WO2014/087011 and WO2017/060475.

Dispersins

Suitable dispersins are polypeptides having hexosaminidase activity, EC 3.2.1.—that catalyzes the hydrolysis of β-1,6-glycosidic linkages of N-acetyl-glucosamine polymers (poly-N-acetylglucosamine) found, e.g., in biofilm.

Peroxidases/Oxidases

A suitable peroxidase is preferably a peroxidase enzyme comprised by the enzyme classification EC 1.11.1.7, as set out by the Nomenclature Committee of the International Union of Biochemistry and Molecular Biology (IUBMB), or any fragment derived therefrom, exhibiting peroxidase activity.

Suitable peroxidases include those of plant, bacterial or fungal origin. Chemically modified or protein engineered mutants are included. Examples of useful peroxidases include peroxidases from *Coprinopsis*, e.g., from *C. cinerea* (EP 179486), and variants thereof as those described in WO 93/24618, WO 95/10602, and WO 98/15257.

Suitable peroxidases also include a haloperoxidase enzyme, such as chloroperoxidase, bromoperoxidase and compounds exhibiting chloroperoxidase or bromoperoxidase activity. Haloperoxidases are classified according to their specificity for halide ions. Chloroperoxidases (E.C. 1.11.1.10) catalyze formation of hypochlorite from chloride ions. The haloperoxidase may be a chloroperoxidase. Preferably, the haloperoxidase is a vanadium haloperoxidase, i.e., a vanadate-containing haloperoxidase. In a preferred method the vanadate-containing haloperoxidase is combined with a source of chloride ion.

Suitable oxidases include, in particular, any laccase enzyme comprised by the enzyme classification EC 1.10.3.2, or any fragment derived therefrom exhibiting laccase activity, or a compound exhibiting a similar activity, such as a catechol oxidase (EC 1.10.3.1), an o-aminophenol oxidase (EC 1.10.3.4), or a bilirubin oxidase (EC 1.3.3.5).

Protease Stabilizers/Inhibitors

Proteases, as described above, may be stabilized using compounds that act by temporarily reducing the proteolytic activity (reversible inhibitors).

Thus, the composition of the invention may also include a protease inhibitor/stabilizer, which is a reversible inhibitor of protease activity, e.g., serine protease activity. Preferably, the protease inhibitor is a (reversible) subtilisin protease inhibitor. In particular, the protease inhibitor may be a peptide aldehyde, boric acid, or a boronic acid; or a derivative of any of these. Examples of protease inhibitors are shown in, for example, WO 96/041859, WO 2009/118375, WO 2010/055052, and WO 2013/004636.

Antioxidants or reducing agents like sulfite, thiosulfate, nitrite, ascorbic acid/ascorbate etc. are also frequently used to stabilize enzymes (and the water phase in general).

Polyhydric Alcohol

The liquid enzyme composition may contain more than 1% w/w (such as 1-80% w/w) of one or more polyols, preferably more than 5% w/w (such as 5-80% w/w) of one or more polyols, and most preferably more than 10% w/w (such as 10-80% w/w) of one or more polyols.

Polyols (or polyhydric alcohols) according to the invention are alcohols with two or more hydroxyl groups. The polyols typically have a molecular weight lower than 500 g/mol.

Polyols include suitable sugar polyols, such as mono- and disaccharides, like glucose, fructose, galactose, sucrose, lactose, maltose, and trehalose.

Polyols also include suitable non-sugars polyols, such as glycerol, ethylene glycol, diethylene glycol, triethylene glycol, propylene glycol, dipropylene glycol, tripropylene glycol, polyethylene glycol (PEG), and sugar alcohols. The polyethylene glycol may have an average molecular weight at or below about 500. Examples of sugar alcohols are sorbitol, mannitol, erythritol, dulcitol, inositol, xylitol and adonitol.

Particularly preferred polyols are aliphatic 1,2-diols selected from the group consisting of 1,2-pentanediol, 1,2-hexanediol, 1,2-heptanediol, and 1,2-octanediol.

Detergent Composition

In one aspect, the invention is directed to a multi-compartment water-soluble unit dose detergent article. The detergent article contains, as a whole, a complete detergent composition.

The detergent article is a unit dose pouch having two or more compartments (at least two compartments) containing liquid compositions, which may also be in the form of a gel or paste.

The unit dose detergent pouch can be configured as having two or more (multi) compartments. It can be of any form, shape and material which is suitable for holding the composition, e.g. without allowing the release of the composition to release of the composition from the pouch prior to water contact. The pouch is made from water soluble film which encloses an inner volume. Said inner volume can be divided into compartments of the pouch. Preferred films are polymeric materials preferably polymers which are formed into a film or sheet. Preferred polymers, copolymers or derivates thereof are selected polyacrylates, and water-soluble acrylate copolymers, methyl cellulose, carboxy methyl cellulose, sodium dextrin, ethyl cellulose, hydroxyethyl cellulose, hydroxypropyl methyl cellulose, maltodextrin, poly methacrylates, most preferably polyvinyl alcohol copolymers and, hydroxypropyl methyl cellulose (HPMC). Preferably the level of polymer in the film for example PVA is at least about 60%. Preferred average molecular weight will typically be about 20,000 to about 150,000. Films can also be of blended compositions comprising hydrolytically degradable and water-soluble polymer blends such as polylactide and polyvinyl alcohol (known under the Trade reference M8630 as sold by MonoSol LLC, Indiana, USA) plus plasticisers like glycerol, ethylene glycerol, propylene glycol, sorbitol and mixtures thereof.

The choice of detergent ingredients is within the skill of the artisan and includes conventional ingredients, including the exemplary non-limiting components set forth below.

The choice of additional detergent components may include, for textile care, the consideration of the type of textile to be cleaned, the type and/or degree of soiling, the temperature at which cleaning is to take place, and the formulation of the detergent product. Although components mentioned below are categorized by general header according to a particular functionality, this is not to be construed as a limitation, as a component may comprise additional functionalities as will be appreciated by the skilled artisan.

In one embodiment, the invention is directed to an ADW (Automatic Dish Wash) compositions comprising an enzyme of the present invention in combination with one or more additional ADW composition components. The choice of additional components is within the skill of the artisan and includes conventional ingredients, including the exemplary non-limiting components set forth below.

Surfactants

The cleaning composition may comprise one or more surfactants, which may be anionic and/or cationic and/or non-ionic and/or semi-polar and/or zwitterionic, or a mixture thereof. In a particular embodiment, the detergent composition includes a surfactant system (comprising more than one surfactant) e.g. a mixture of one or more nonionic surfactants and one or more anionic surfactants. In one embodiment the detergent comprises at least one anionic surfactant than at least one non-ionic surfactant, the weight ratio of anionic to nonionic surfactant may be from 10:1 to 1:10. In one embodiment the amount of anionic surfactant is higher than the amount of non-ionic surfactant e.g. the weight ratio of anionic to non-ionic surfactant may be from 10:1 to 1.1:1 or from 5:1 to 1.5:1. The amount of anionic to non-ionic surfactant may also be equal and the weight ratios 1:1. In one embodiment the amount of non-ionic surfactant is higher than the amount of anionic surfactant and the weight ratio may be 1:10 to 1:1.1. Preferably the weight ratio of anionic to non-ionic surfactant is from 10:1 to 1:10, such as from 5:1 to 1:5, or from 5:1 to 1:1.2. Preferably, the weight fraction of non-ionic surfactant to anionic surfactant is from 0 to 0.5 or 0 to 0.2 thus non-ionic surfactant can be present or absent if the weight fraction is 0, but if non-ionic surfactant is present, then the weight fraction of the nonionic surfactant is preferably at most 50% or at most 20% of the total weight of anionic surfactant and non-ionic surfactant. Light duty detergent usually comprises more nonionic than anionic surfactant and there the fraction of non-ionic surfactant to anionic surfactant is preferably from 0.5 to 0.9. The total weight of surfactant(s) is typically present at a level of from about 0.1% to about 60% by weight, such as about 1% to about 40%, or about 3% to about 20%, or about 3% to about 10%. The surfactant(s) is chosen based on the desired cleaning application, and may include any conventional surfactant(s) known in the art. When included therein the detergent will usually contain from about 1% to about 40% by weight of an anionic surfactant, such as from about 5% to about 30%, including from about 5% to about 15%, or from about 15% to about 20%, or from about 20% to about 25% of an anionic surfactant. Non-limiting examples of anionic surfactants include sulfates and sulfonates, typically available as sodium or potassium salts or salts of monoethanolamine (MEA, 2-aminoethan-1-ol) or triethanolamine (TEA, 2,2',2"-nitrilotriethan-1-ol); in particular, linear alkylbenzenesulfonates (LAS), isomers of LAS such as branched alkylbenzenesulfonates (BABS) and phenylalkanesulfonates; olefin sulfonates, in particular alpha-olefin-sulfonates (AOS); alkyl sulfates (AS), in particular fatty alcohol sulfates (FAS), i.e., primary alcohol sulfates (PAS) such as dodecyl sulfate; alcohol ethersulfates (AES or AEOS or FES, also known as alcohol ethoxysulfates or fatty alcohol ether sulfates); paraffin sulfonates (PS) including alkane-1-sulfonates and secondary alkanesulfonates (SAS); ester sulfonates, including sulfonated fatty acid glycerol esters and alpha-sulfo fatty acid methyl esters (alpha-SFMe or SES or MES); alkyl- or alkenylsuccinic acids such as dodecenyl/tetradecenyl succinic acid (DTSA); diesters and monoesters of sulfosuccinic acid; fatty acid derivatives of amino acids. Furthermore, salts of fatty acids (soaps) may be included.

When included therein the detergent will usually contain from about 1% to about 40% by weight of a cationic surfactant, for example from about 0.5% to about 30%, in particular from about 1% to about 20%, from about 3% to about 10%, such as from about 3% to about 5%, from about 8% to about 12% or from about 10% to about 12%. Non-limiting examples of cationic surfactants include alkyldimethylethanolamine quat (ADMEAQ), cetyltrimethylammonium bromide (CTAB), dimethyldistearylammonium chloride (DSDMAC), and alkylbenzyldimethylammonium, alkyl quaternary ammonium compounds, alkoxylated quaternary ammonium (AQA) compounds, ester quats, and combinations thereof.

When included therein the detergent will usually contain from about 0.2% to about 40% by weight of a nonionic surfactant, for example from about 0.5% to about 30%, in particular from about 1% to about 20%, from about 3% to about 10%, such as from about 3% to about 5%, from about 8% to about 12%, or from about 10% to about 12%. Non-limiting examples of nonionic surfactants include alcohol ethoxylates (AE or AEO) e.g. the AEO-series such as AEO-7, alcohol propoxylates, in particular propoxylated fatty alcohols (PFA), ethoxylated and propoxylated alcohols, alkoxylated fatty acid alkyl esters, such as ethoxylated and/or propoxylated fatty acid alkyl esters (in particular methyl ester ethoxylates, MEE), alkylpolyglycosides (APG), alkoxylated amines, fatty acid monoethanolamides (FAM), fatty acid diethanolamides (FADA), ethoxylated fatty acid monoethanolamides (EFAM), propoxylated fatty acid monoethanolamides (PFAM), polyhydroxyalkyl fatty acid amides, or N-acyl N-alkyl derivatives of glucosamine (glucamides, GA, or fatty acid glucamides, FAGA), as well as products available under the trade names SPAN and TWEEN, and combinations thereof.

When included therein the detergent will usually contain from about 0.01 to about 10% by weight of a semipolar surfactant. Non-limiting examples of semipolar surfactants include amine oxides (AO) such as alkyldimethylamine oxides, in particular N-(coco alkyl)-N,N-dimethylamine oxide and N-(tallow-alkyl)-N,N-bis(2-hydroxyethyl)amine oxide, and combinations thereof.

When included therein the detergent will usually contain from about 0.01% to about 10% by weight of a zwitterionic surfactant. Non-limiting examples of zwitterionic surfactants include betaines such as alkyldimethylbetaines, sulfobetaines, and combinations thereof.

Additional bio-based surfactants may be used e.g. wherein the surfactant is a sugar-based non-ionic surfactant which may be a hexyl-β-D-maltopyranoside, thiomaltopyranoside or a cyclic-maltopyranoside, such as described in EP2516606 B1.

Builders and Co-Builders

The detergent composition may contain about 0-65% by weight, such as about 5% to about 50% of a detergent builder or co-builder, or a mixture thereof. In a dish wash detergent, the level of builder is typically in the range 40-65%, particularly in the range 50-65%. The builder and/or co-builder may particularly be a chelating agent that forms water-soluble complexes with Ca and Mg. Any builder and/or co-builder known in the art for use in cleaning detergents may be utilized.

Non-limiting examples of builders include zeolites, diphosphates (pyrophosphates), triphosphates such as sodium triphosphate (STP or STPP), carbonates such as sodium carbonate, soluble silicates such as sodium metasilicate, layered silicates (e.g., SKS-6 from Clariant), ethanolamines such as 2-aminoethan-1-ol (MEA), diethanolamine (DEA, also known as 2,2'-iminodiethan-1-ol), triethanolamine (TEA, also known as 2,2',2"-nitrilotriethan-1-ol), and (carboxymethyl)inulin (CMI), and combinations thereof.

The detergent composition may also contain from about 0-50% by weight, such as about 5% to about 30%, of a detergent co-builder. The detergent composition may include a co-builder alone, or in combination with a builder, for example a zeolite builder. Non-limiting examples of co-builders include homopolymers of polyacrylates or copolymers thereof, such as poly(acrylic acid) (PAA) or copoly (acrylic acid/maleic acid) (PAA/PMA). Further non-limiting examples include citrate, chelators such as aminocarboxylates, aminopolycarboxylates and phosphonates, and alkyl- or alkenylsuccinic acid. Additional specific examples include 2,2',2"-nitrilotriacetic acid (NTA), ethylenediaminetetraacetic acid (EDTA), diethylenetriaminepentaacetic acid (DTPA), iminodisuccinic acid (IDS), ethylenediamine-N,N'-disuccinic acid (EDDS), methylglycinediacetic acid (MGDA), glutamic acid-N,N-diacetic acid (GLDA), 1-hydroxyethane-1,1-diylbis(phosphonic acid (HEDP), ethylenediaminetetramethylenetetrakis(phosphonic acid) (EDTMPA), diethylenetriaminepentamethylenepentakis (phosphonic acid) (DTMPA or DTPMPA), N-(2-hydroxyethyl)iminodiacetic acid (EDG), aspartic acid-N-monoacetic acid (ASMA), aspartic acid-N,N-diacetic acid (ASDA), aspartic acid-N-monopropionic acid (ASMP), iminodisuccinic acid (IDA), N-(2-sulfomethyl)aspartic acid (SMAS), N-(2-sulfoethyl)aspartic acid (SEAS), N-(2-sulfomethyl) glutamic acid (SMGL), N-(2-sulfoethyl)glutamic acid (SEGL), N-methyliminodiacetic acid (MIDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N,N-diacetic acid (TUDA) and sulfomethyl-N,N-diacetic acid (SMDA), N-(2-hydroxyethyl)ethylenediamine-N,N',N"-triacetic acid (HEDTA), diethanolglycine (DEG), aminotrimethylenetris(phosphonic acid) (ATMP), and combinations and salts thereof. Further exemplary builders and/or co-builders are described in, e.g., WO 09/102854, U.S. Pat. No. 5,977,053.

Polymers

The detergent may contain 0.005-10% by weight, such as 0.5-5%, 2-5%, 0.5-2% or 0.2-1% of a polymer. Any polymer known in the art for use in detergents may be utilized. The polymer may function as a co-builder as mentioned above, or may provide antiredeposition, fiber protection, soil release, dye transfer inhibition, grease cleaning and/or anti-foaming properties. Some polymers may have more than one of the above-mentioned properties and/or more than one of the below-mentioned motifs. Exemplary polymers include (carboxymethyl)cellulose (CMC), poly(vinyl alcohol) (PVA), poly(ethyleneglycol) or poly(ethylene oxide) (PEG or PEO), ethoxylated poly(ethyleneimine), (carboxymethyl)inulin (CMI), carboxylate polymers and polycarboxylates such as polyacrylates, maleic/acrylic acid copolymers, acrylate/styrene copolymers, poly(aspartic)

acid, and lauryl methacrylate/acrylic acid copolymers, hydrophobically modified CMC (HM-CMC), silicones, copolymers of terephthalic acid and oligomeric glycols, copolymers of poly(ethylene terephthalate) and poly (oxyethene terephthalate) (PET-POET), poly(vinylpyrrolidone) (PVP), poly(vinylimidazole) (PVI), poly(vinylpyridine-N-oxide) (PVPO or PVPNO) and copoly (vinylimidazole/vinylpyrrolidone) (PVPVI). Suitable examples include PVP-K15, PVP-K30, ChromaBond S-400, ChromaBond S-403E and Chromabond S-100 from Ashland Aqualon, and Sokalan® HP 165, Sokalan® HP 50 (Dispersing agent), Sokalan® HP 53 (Dispersing agent), Sokalan® HP 59 (Dispersing agent), Sokalan® HP 56 (dye transfer inhibitor), Sokalan® HP 66 K (dye transfer inhibitor) from BASF. Further exemplary polymers include sulfonated polycarboxylates, polyethylene oxide and polypropylene oxide (PEO-PPO) and diquaternium ethoxy sulfate. Particularly preferred polymer is ethoxylated homopolymer Sokalan® HP 20 from BASF, which helps to prevent redeposition of soil in the wash liqor. Further exemplary polymers include sulfonated polycarboxylates, ethylene oxide-propylene oxide copolymers (PEO-PPO), copolymers of PEG with and vinyl acetate, and diquaternium ethoxy sulfate or quaternized sulfated ethoxylated hexamethylenediamine. Other exemplary polymers are disclosed in, e.g., WO 2006/130575. Salts of the above-mentioned polymers are also contemplated.

Adjunct Materials

Any detergent components known in the art for use in laundry/ADW/hard surface cleaning detergents may also be utilized. Other optional detergent components include anti-corrosion agents, anti-shrink agents, anti-soil redeposition agents, anti-wrinkling agents, bactericides, binders, corrosion inhibitors, disintegrants/disintegration agents, dyes, enzyme stabilizers (including boric acid, borates, CMC, and/or polyols such as propylene glycol), fabric conditioners including clays, fillers/processing aids, fluorescent whitening agents/optical brighteners, foam boosters, foam (suds) regulators, perfumes, soil-suspending agents, softeners, suds suppressors, tarnish inhibitors, and wicking agents, either alone or in combination. Any ingredient known in the art for use in laundry/ADW/hard surface cleaning detergents may be utilized. The choice of such ingredients is well within the skill of the artisan.

Dispersants

The detergent compositions of the present invention can also contain dispersants. In particular powdered detergents may comprise dispersants. Suitable water-soluble organic materials include the homo- or co-polymeric acids or their salts, in which the polycarboxylic acid comprises at least two carboxyl radicals separated from each other by not more than two carbon atoms. Suitable dispersants are for example described in Powdered Detergents, Surfactant science series volume 71, Marcel Dekker, Inc.

Dye Transfer Inhibiting Agents

The detergent compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in a subject composition, the dye transfer inhibiting agents may be present at levels from about 0.0001% to about 10%, from about 0.01% to about 5% or even from about 0.1% to about 3% by weight of the composition.

Fluorescent Whitening Agent

The detergent compositions of the present invention will preferably also contain additional components that may tint articles being cleaned, such as fluorescent whitening agent or optical brighteners. Where present the brightener is preferably at a level of about 0.01% to about 0.5%. Any fluorescent whitening agent suitable for use in a laundry detergent composition may be used in the composition of the present invention. The most commonly used fluorescent whitening agents are those belonging to the classes of diaminostilbene-sulfonic acid derivatives, diarylpyrazoline derivatives and bisphenyl-distyryl derivatives. Examples of the diaminostilbene-sulfonic acid derivative type of fluorescent whitening agents include the sodium salts of: 4,4'-bis-(2-diethanolamino-4-anilino-s-triazin-6-ylamino) stilbene-2,2'-disulfonate, 4,4'-bis-(2,4-dianilino-s-triazin-6-ylamino) stilbene-2,2'-disulfonate, 4,4'-bis-(2-anilino-4-(N-methyl-N-2-hydroxy-ethylamino)-s-triazin-6-ylamino) stilbene-2,2'-disulfonate, 4,4'-bis-(4-phenyl-1,2,3-triazol-2-yl)stilbene-2,2'-disulfonate and sodium 5-(2H-naphtho[1,2-d][1,2,3]triazol-2-yl)-2-[(E)-2-phenylvinyl]benzenesulfonate. Preferred fluorescent whitening agents are Tinopal DMS and Tinopal CBS available from Ciba-Geigy AG, Basel, Switzerland. Tinopal DMS is the disodium salt of 4,4'-bis-(2-morpholino-4-anilino-s-triazin-6-ylamino) stilbene-2,2'-disulfonate. Tinopal CBS is the disodium salt of 2,2'-bis-(phenyl-styryl)-disulfonate. Also preferred are fluorescent whitening agents is the commercially available Parawhite KX, supplied by Paramount Minerals and Chemicals, Mumbai, India. Other fluorescers suitable for use in the invention include the 1-3-diaryl pyrazolines and the 7-alkylaminocoumarins.

Suitable fluorescent brightener levels include lower levels of from about 0.01, from 0.05, from about 0.1 or even from about 0.2 wt % to upper levels of 0.5 or even 0.75 wt %.

Soil Release Polymers

The detergent compositions of the present invention may also include one or more soil release polymers which aid the removal of soils from fabrics such as cotton and polyester based fabrics, in particular the removal of hydrophobic soils from polyester based fabrics. The soil release polymers may for example be nonionic or anionic terephthalate-based polymers, polyvinyl caprolactam and related copolymers, vinyl graft copolymers, polyester polyamides see for example Chapter 7 in Powdered Detergents, Surfactant science series volume 71, Marcel Dekker, Inc. Other types of soil release polymers are amphiphilic alkoxylated grease cleaning polymers comprising a core structure and a plurality of alkoxylate groups attached to that core structure. The core structure may comprise a polyalkylenimine structure or a polyalkanolamine structure as described in detail in WO 2009/087523 (hereby incorporated by reference). Furthermore, random graft co-polymers are suitable soil release polymers. Suitable graft co-polymers are described in more detail in WO 2007/138054, WO 2006/108856 and WO 2006/113314 (hereby incorporated by reference). Other soil release polymers are substituted polysaccharide structures especially substituted cellulosic structures such as modified cellulose deriviatives such as those described in EP 1867808 or WO 2003/040279 (both are hereby incorporated by reference). Suitable cellulosic polymers include cellulose, cellulose ethers, cellulose esters, cellulose amides and mixtures thereof. Suitable cellulosic polymers include anionically modified cellulose, nonionically modified cellulose, cationically modified cellulose, zwitterionically modified cellulose, and mixtures thereof. Suitable cellulosic polymers include methyl cellulose, carboxy methyl cellulose, ethyl cellulose, hydroxyl ethyl cellulose, hydroxyl propyl methyl cellulose, ester carboxy methyl cellulose, and mixtures thereof.

Anti-Redeposition Agents

The detergent compositions of the present invention may also include one or more anti-redeposition agents such as carboxymethylcellulose (CMC), polyvinyl alcohol (PVA), polyvinylpyrrolidone (PVP), polyoxyethylene and/or polyethyleneglycol (PEG), homopolymers of acrylic acid, copolymers of acrylic acid and maleic acid, and ethoxylated polyethyleneimines. The cellulose based polymers described under soil release polymers above may also function as anti-redeposition agents.

Rheology Modifiers

The detergent compositions of the present invention may also include one or more rheology modifiers, structurants or thickeners, as distinct from viscosity reducing agents. The rheology modifiers are selected from the group consisting of non-polymeric crystalline, hydroxy-functional materials, polymeric rheology modifiers which impart shear thinning characteristics to the aqueous liquid matrix of a liquid detergent composition. The rheology and viscosity of the detergent can be modified and adjusted by methods known in the art, for example as shown in EP 2169040.

Other suitable adjunct materials include, but are not limited to, anti-shrink agents, anti-wrinkling agents, bactericides, binders, carriers, dyes, enzyme stabilizers, fabric softeners, fillers, foam regulators, hydrotropes, perfumes, pigments, sod suppressors, solvents, and structurants for liquid detergents and/or structure elasticizing agents.

Further embodiments of the invention include:

Embodiment 1. A liquid enzyme composition comprising:

0.01-25% w/w of active enzyme protein, and 0.05-30% w/w of a sulfite scavenger or a sulfite radical scavenger.

Embodiment 2. The liquid enzyme composition of embodiment 1, wherein the enzyme is selected from the group consisting of protease, lipase, cutinase, amylase, cellulase, pectinase, mannanase, arabinase, galactanase, xylanase, nuclease, dispersin, perhydrolase, catalase, and oxidase.

Embodiment 3. The liquid enzyme composition of any of the preceding embodiments, wherein the enzyme is a protease, amylase, carbohydrase, nuclease, or a lipolytic enzyme.

Embodiment 4. The liquid enzyme composition of any of the preceding embodiments, wherein the enzyme is a lipolytic enzyme.

Embodiment 5. The liquid enzyme composition of any of the preceding embodiments, wherein the sulfite scavenger is a compound having a redox potential of more than 0.1V vs SHE.

Embodiment 6. The liquid enzyme composition of any of the preceding embodiments, wherein the sulfite scavenger is a compound having a redox potential of less than 0.6V vs SHE.

Embodiment 7. The liquid enzyme composition of any of the preceding embodiments, wherein the sulfite scavenger is selected from the group consisting of N-methylmorpholine N-oxide, pyridine N-oxide (and derivatives), potassium ferricyanide and other salts of ferricyanide, and oxidized glutathione.

Embodiment 8. The liquid enzyme composition of any of the preceding embodiments, wherein the sulfite scavenger is a compound forming covalent bonds with sulfite, bisulfite or metabisulfite.

Embodiment 9. The liquid enzyme composition of any of the preceding embodiments, wherein the sulfite scavenger is an aldehyde or ketone forming covalent bonds with sulfite, bisulfite or metabisulfite.

Embodiment 10. The liquid enzyme composition of any of the preceding embodiments, wherein the sulfite scavenger is an aldehyde forming covalent bonds with sulfite, bisulfite or metabisulfite selected from the group consisting of glyoxylic acid/glyoxalate, acetaldehyde, glyceraldehyde, citral, benzaldehyde, formaldehyde, acrolein, senecioaldehyde, furfural, butyraldehyde, cinnamaldehyde, and betaine aldehyde.

Embodiment 11. The liquid enzyme composition of any of the preceding embodiments, wherein the sulfite scavenger is a ketone forming covalent bonds with sulfite, bisulfite or metabisulfite selected from the group consisting of pyruvic acid, oxaloacetate, 2-pentanone, butanone, cyclohexanone, diethyl 2-methyl-3-oxosuccinate, acetoacidic acid, ethyl acetoacetate, and methyl acetoacetate.

Embodiment 12. The liquid enzyme composition of any of the preceding embodiments, wherein the sulfite scavenger is selected from the group consisting of acetaldehyde, glyoxylic acid, glyoxalate, betaine aldehyde, glyceraldehyde, pyruvic acid, oxaloacetate, ethyl acetoacetate, and methyl acetoacetate.

Embodiment 13. The liquid enzyme composition of any of the preceding embodiments, wherein the sulfite radical scavenger can react with the sulfur trioxide radical anion and undergo one electron reduction.

Embodiment 14. The liquid enzyme composition of any of the preceding embodiments, wherein the sulfite radical scavenger is selected from the group consisting of ascorbic acid/ascorbate, erythorbic acid/erythrobate, hydroquinone, tryptophan and its metabolites, cysteine, metal salts (e.g. $FeSO_4$, $FeCl_2$, $CoCl_2$, $Zn(CH_3COO)$ 2), halide salts (e.g. KI, KBr), mannitol (and other sugar alcohols), flavonoids (Cathecin, Chrysin, Genistein, etc.), phenolic acids (Gallic acid, Ellagic acid, p-coumarin, ferulic acid), indoles, alyl sulfide, vitamin A (Retinol), tocopherols (α, β, λ and δ tocopherol), tocotrienols, beta-carotene, vitamin K, butylated hydroxyanisole (BHA), butylated hydroxytoluene (BHT), tert-butylhydroquinone (TBHQ), trimethoxy benzoic acid (TMBA), 2,4,5-trihydroxy butyrophenone, nordihydroguaiaretic acid (NGDA), 4-hexylresorcinol, 24ereph (6-hydroxy-2,5,7,8-tetramethylchroman-2-carboxylic acid), tannic acid, gallic acid and its alkyl ester (e.g. propyl gallate), ethoxyquin, 2,2,4-trimethyl-1,2-dihydroquinoline and polymers thereof, Tinogard TT, Tinogard AO-6, Tinogard TS, uric acid, dihydroxy fumaric acid and salts thereof, 4-hydroxybenzoic acid, and hydroxycinnamic acid Embodiment 15. The liquid enzyme composition of any of the preceding embodiments, wherein the sulfite radical scavenger is selected from the group consisting of ascorbic acid/ascorbate, erythorbic acid/erythrobate, hydroquinone and derivatives, gallic acid and its alkyl esters, Trolox (6-hydroxy-2,5,7,8-tetramethylchroman-2-carboxylic acid), cysteine, halide salts (potassium iodine and potassium bromine), and trimethoxy benzoic acid (TMBA).

Embodiment 16. The liquid enzyme composition of any of the preceding embodiments, which comprises 0.05-25% w/w of active enzyme protein, preferably 0.1-25% w/w of active enzyme protein.

Embodiment 17. The liquid enzyme composition of any of the preceding embodiments, which comprises 0.1-25% w/w of sulfite scavenger or sulfite radical scavenger, preferably 0.5-20% w/w of sulfite scavenger or sulfite radical scavenger.

Embodiment 18. The liquid enzyme composition of any of the preceding embodiments, further comprising 1-80% w/w of a polyhydric alcohol, preferably 5-80% w/w of a polyhydric alcohol.

Embodiment 19. The liquid enzyme composition of any of the preceding embodiments, further comprising 10-98% w/w water, preferably 10-80% w/w water.

Embodiment 20. The liquid enzyme composition of any of the preceding embodiments, wherein the polyhydric alcohol is selected from the group consisting of glycerol, ethylene glycol, diethylene glycol, triethylene glycol, propylene glycol, dipropylene glycol, tripropylene glycol, polyethylene glycol (PEG), and sugar alcohols.

Embodiment 21. A multi-compartment water-soluble unit dose detergent article, comprising (a) a first compartment consisting of the liquid enzyme composition of any of the preceding embodiments, and (b) a second compartment comprising a salt of sulfite, bisulfite or metabisulfite, and one or more detergent ingredients selected from surfactants, builders, dye transfer inhibiting agents, dispersants, anti-redeposition agents, suds suppressors, hueing dyes, aesthetic dyes, opacifiers, perfumes, structurants, hydrotropes, pigments and mixtures thereof; wherein the first and second compartments are adjacent, and each is surrounded by water-soluble film.

Embodiment 22. The multi-compartment water-soluble unit dose detergent article of any of the preceding embodiments, wherein the water-soluble film comprises at least one polyvinylalcohol or a copolymer thereof, preferably, the water-soluble film comprises a blend of at least two different polyvinylalcohol homopolymers, at least two different polyvinylalcohol copolymers, at least one polyvinylalcohol homopolymer and at least one polyvinylalcohol copolymer or a combination thereof.

Embodiment 23. The multi-compartment water-soluble unit dose detergent article of any of the preceding embodiments, wherein the surfactant is non-ionic surfactant.

Embodiment 24. The multi-compartment water-soluble unit dose detergent article of any of the preceding embodiments, wherein the surfactant is a mixture of non-ionic surfactant and anionic surfactant.

Embodiment 25. The multi-compartment water-soluble unit dose detergent article of any of the preceding embodiments, wherein the ratio of non-ionic surfactant to anionic surfactant is between 20:1 to 1:1, more preferably between 18:1 and 5:1.

Embodiment 26. The water-soluble unit dose article according to any preceding embodiments wherein the anionic surfactant is selected from linear alkylbenzene sulphonate, alkoxylated alkyl sulfate, or a mixture thereof.

Embodiment 27. The water-soluble unit dose article according to any preceding embodiments wherein the non-ionic surfactant is selected from fatty alcohol alkoxylate, an oxo-synthesised fatty alcohol alkoxylate, Guerbet alcohol alkoxylates, alkyl phenol alcohol alkoxylates or a mixture thereof.

Embodiment 28. A method of making the multi-compartment water-soluble unit dose detergent article of any of the preceding embodiments, comprising (a) encapsulating the liquid enzyme composition of any preceding embodiments in a first compartment, and (b) encapsulating a second composition comprising a salt of sulfite, bisulfite or metabisulfite, and one or more detergent ingredients selected from surfactants, builders, dye transfer inhibiting agents, dispersants, anti-redeposition agents, suds suppressors, hueing dyes, aesthetic dyes, opacifiers, perfumes, structurants, hydrotropes, pigments and mixtures thereof, in a second compartment;

wherein the first and second compartments are adjacent, and each is surrounded by water-soluble film.

Determining Standard Reduction Potentials

The standard reduction potential is determined in an electrochemical cell, such as the galvanic cell, using a standard electrode such as the Normal Hydrogen Electrode (NHE) or a KCl-saturated calomel electrode. The standard reduction potential is defined as the electrical potential (i.e., the voltage developed) of a reversible electrode at standard state in which solutes are at an effective concentration of 1 mol/liter, the activity for each pure solid, pure liquid, or for water (solvent) is 1, the pressure of each gaseous reagent is 1 atm., and the temperature is 25° C. The standard reduction potential is herein defined against the Standard Hydrogen Electrode (SHE) unless otherwise stated.

The invention claimed is:

1. A multi-compartment water-soluble unit dose detergent article, comprising:

(a) a first compartment consisting of the liquid enzyme composition, and (b) a second compartment comprising a salt of sulfite, bisulfite or metabisulfite, and one or more detergent ingredients selected from surfactants, builders, dye transfer inhibiting agents, dispersants, anti-redeposition agents, suds suppressors, hueing dyes, aesthetic dyes, opacifiers, perfumes, structurants, hydrotropes, pigments and mixtures thereof;

wherein the first and second compartments are adjacent, and each is surrounded by water-soluble film;

wherein the liquid enzyme composition comprises:

0.01-25% w/w of active enzyme protein, and 0.05-30% w/w of a sulfite scavenger or 0.05-30% w/w of a sulfite radical scavenger;

wherein the sulfite scavenger is a compound having a redox potential of 0.1-0.6V vs SHE, or is an aldehyde or ketone forming covalent bonds with sulfite, bisulfite or metabisulfite; and wherein the sulfite radical scavenger can react with the sulfur trioxide radical anion and undergo one electron reduction.

2. The multi-compartment water-soluble unit dose detergent article of claim 1, wherein the water-soluble film comprises at least one polyvinylalcohol or a copolymer thereof.

3. The multi-compartment water-soluble unit dose detergent article of claim 1, wherein the water-soluble film comprises a blend of at least two different polyvinylalcohol homopolymers, at least two different polyvinylalcohol copolymers, at least one polyvinylalcohol homopolymer and at least one polyvinylalcohol copolymer or a combination thereof.

4. The multi-compartment water-soluble unit dose detergent article of claim 1, wherein the surfactant is non-ionic surfactant, or a mixture of non-ionic surfactant and anionic surfactant.

5. A method of making the multi-compartment water-soluble unit dose detergent article of claim 1, the method comprising:

(a) encapsulating the liquid enzyme composition in a first compartment, and (b) encapsulating a second composition comprising a salt of sulfite, bisulfite or metabisulfite, and one or more detergent ingredients selected from surfactants, builders, dye transfer inhibiting agents, dispersants, antiredeposition agents, suds suppressors, hueing dyes, aesthetic dyes, opacifiers, perfumes, structurants, hydrotropes, pigments and mixtures thereof, in a second compartment;

wherein the first and second compartments are adjacent, and each is surrounded by water-soluble film.

6. The multi-compartment water-soluble unit dose detergent article of claim 1, wherein the enzyme is selected from protease, lipase, cutinase, amylase, cellulase, pectinase, mannanase, arabinase, galactanase, xylanase, nuclease, dispersin, perhydrolase, catalase, and oxidase.

7. The multi-compartment water-soluble unit dose detergent article of claim 1, wherein the enzyme is selected from protease, amylase, carbohydrase, nuclease, and lipolytic enzyme.

8. The multi-compartment water-soluble unit dose detergent article of claim 1, wherein the enzyme is a lipolytic enzyme.

9. The multi-compartment water-soluble unit dose detergent article of claim 1, wherein the sulfite scavenger is a compound having a redox potential of 0.1-0.6V vs SHE.

10. The multi-compartment water-soluble unit dose detergent article of claim 1, wherein the sulfite scavenger is selected from N-methylmorpholine N-oxide, pyridine N-oxide and derivatives, potassium ferricyanide and other salts of ferricyanide, and oxidized glutathione.

11. The multi-compartment water-soluble unit dose detergent article of claim 1, wherein the sulfite scavenger is a compound forming covalent bonds with sulfite, bisulfite or metabisulfite.

12. The multi-compartment water-soluble unit dose detergent article of claim 1, wherein the sulfite scavenger is an aldehyde or ketone, or is selected from acetaldehyde, glyoxylic acid, glyoxalate, betaine aldehyde, glyceraldehyde, pyruvic acid, oxaloacetate, ethyl acetoacetate, and methyl acetoacetate.

13. The multi-compartment water-soluble unit dose detergent article of claim 1, wherein the sulfite radical scavenger can react with the sulfur trioxide radical anion and undergo one electron reduction.

14. The multi-compartment water-soluble unit dose detergent article of claim 1, wherein the sulfite radical scavenger is selected from ascorbic acid/ascorbate, erythorbic acid/erythrobate, hydroquinone and derivatives, gallic acid and its alkyl esters, Trolox (6-hydroxy-2,5,7,8-tetramethylchroman-2-carboxylic acid), cysteine, halide salts (potassium iodine and potassium bromine), and trimethoxy benzoic acid (TMBA).

15. The multi-compartment water-soluble unit dose detergent article of claim 1, which comprises 0.05-25% w/w of active enzyme protein.

16. The multi-compartment water-soluble unit dose detergent article of claim 1, which comprises 0.1-25% w/w of active enzyme protein.

17. The multi-compartment water-soluble unit dose detergent article of claim 1, further comprising 1-80% w/w of a polyhydric alcohol.

18. The multi-compartment water-soluble unit dose detergent article of claim 1, further comprising 5-80% w/w of a polyhydric alcohol.

19. The multi-compartment water-soluble unit dose detergent article of claim 1, further comprising 10-98% w/w water.

20. The multi-compartment water-soluble unit dose detergent article of claim 1, further comprising 10-80% w/w water.

21. The multi-compartment water-soluble unit dose detergent article of claim 1, wherein the polyhydric alcohol is selected from glycerol, ethylene glycol, diethylene glycol, triethylene glycol, propylene glycol, dipropylene glycol, tripropylene glycol, polyethylene glycol (PEG), and sugar alcohols.

* * * * *